(12) United States Patent
Dowski, Jr.

(10) Patent No.: US 6,940,649 B2
(45) Date of Patent: Sep. 6, 2005

(54) WAVEFRONT CODED IMAGING SYSTEMS

(75) Inventor: Edward Raymond Dowski, Jr., Lafayette, CO (US)

(73) Assignee: The Regents of the University of Colorado, Boulder, CO (US)

(*) Notice: Subject to any disclaimer, the term of this patent is extended or adjusted under 35 U.S.C. 154(b) by 5 days.

(21) Appl. No.: 10/407,708

(22) Filed: Apr. 4, 2003

(65) Prior Publication Data

US 2004/0004766 A1 Jan. 8, 2004

Related U.S. Application Data

(63) Continuation of application No. 09/747,788, filed on Dec. 22, 2000, now abandoned, and a continuation-in-part of application No. 09/070,969, filed on May 1, 1998, now abandoned, which is a continuation-in-part of application No. 08/823,894, filed on Mar. 17, 1997, now Pat. No. 5,748,371, which is a continuation of application No. 08/384,257, filed on Feb. 3, 1995, now abandoned.

(51) Int. Cl.[7] .............................................. G02B 5/18
(52) U.S. Cl. ...................... 359/558; 339/563; 339/564; 339/11; 382/312; 382/210
(58) Field of Search ............................... 359/558, 559, 359/563, 564, 11, 29; 382/312, 210, 212; 356/3, 394

(56) References Cited

U.S. PATENT DOCUMENTS

| | | |
|---|---|---|
| 2,959,105 A | 11/1960 | Sayanagi |
| 3,054,898 A | 9/1962 | Westover et al. |
| 3,305,294 A | 2/1967 | Alvarez |
| 3,583,790 A | 6/1971 | Baker |
| 3,614,310 A | 10/1971 | Korpel |
| 3,856,400 A | 12/1974 | Hartmann et al. |
| 3,873,958 A | 3/1975 | Whitehouse |
| 4,062,619 A | 12/1977 | Hoffman |
| 4,082,431 A | 4/1978 | Ward, III |
| 4,174,885 A | 11/1979 | Joseph et al. |
| 4,178,090 A | 12/1979 | Marks et al. |
| 4,255,014 A | 3/1981 | Ellis |

(Continued)

FOREIGN PATENT DOCUMENTS

| | | |
|---|---|---|
| EP | 0531926 B1 | 3/1993 |
| EP | 0584769 B1 | 3/1994 |

(Continued)

OTHER PUBLICATIONS

Siebert, J. (Officer), International Search Report received in PCT/US01/26126, international filing date Aug. 20, 2001, Completion Date Jun. 24, 2003, 3 pages.S.

(Continued)

*Primary Examiner*—Fayez G. Assaf
(74) *Attorney, Agent, or Firm*—Lathrop & Gage LC

(57) ABSTRACT

The present invention provides improved Wavefront Coding imaging apparatus and methods composed of optics, a detector, and processing of the detected image. The optics are constructed and arranged to have the characteristic that the transverse ray intercept curves form substantially straight, sloped lines. The wavefront coding corrects for known or unknown amounts of "misfocus-like" aberrations by altering the optical transfer function of the imaging apparatus in such a way that the altered optical transfer function is substantially insensitive to aberrations. Post processing then removes the effect of the coding, except for the invariance with regard to aberrations, thereby producing clear images.

10 Claims, 18 Drawing Sheets

U.S. PATENT DOCUMENTS

| | | | |
|---|---|---|---|
| 4,275,454 A | 6/1981 | Klooster, Jr. |
| 4,276,620 A | 6/1981 | Kahn et al. |
| 4,308,521 A | 12/1981 | Casasent et al. |
| 4,349,277 A | 9/1982 | Mundy et al. |
| 4,466,067 A | 8/1984 | Fontana |
| 4,480,896 A | 11/1984 | Kubo et al. |
| 4,573,191 A | 2/1986 | Kidode et al. |
| 4,575,193 A | 3/1986 | Greivenkamp, Jr. |
| 4,580,882 A | 4/1986 | Nuchman et al. |
| 4,589,770 A | 5/1986 | Jones et al. |
| 4,642,112 A | 2/1987 | Freeman |
| 4,650,292 A | 3/1987 | Baker et al. |
| 4,655,565 A | 4/1987 | Freeman |
| 4,725,881 A | 2/1988 | Buchwald |
| 4,734,702 A | 3/1988 | Kaplan |
| 4,794,550 A | 12/1988 | Greivenkamp, Jr. |
| 4,804,249 A | 2/1989 | Reynolds et al. |
| 4,825,263 A | 4/1989 | Desjardins et al. |
| 4,827,125 A | 5/1989 | Goldstein |
| 4,843,631 A | 6/1989 | Steinpichler et al. |
| 4,936,661 A | 6/1990 | Betensky et al. |
| 4,964,707 A | 10/1990 | Hayashi |
| 4,989,959 A | 2/1991 | Plummer |
| 5,003,166 A | 3/1991 | Girod |
| 5,076,687 A | 12/1991 | Adelson |
| 5,102,223 A | 4/1992 | Uesugi et al. |
| 5,128,874 A | 7/1992 | Bhanu et al. |
| 5,142,413 A | 8/1992 | Kelly |
| 5,165,063 A | 11/1992 | Strater et al. |
| 5,166,818 A | 11/1992 | Chase et al. |
| 5,193,124 A | 3/1993 | Subbarao |
| 5,218,471 A | 6/1993 | Swanson et al. |
| 5,243,351 A | 9/1993 | Rafanelli et al. |
| 5,248,876 A | 9/1993 | Kerstens et al. |
| 5,260,727 A | 11/1993 | Oksman et al. |
| 5,270,825 A | 12/1993 | Takasugi et al. |
| 5,270,861 A | 12/1993 | Estelle |
| 5,270,867 A | 12/1993 | Estelle |
| 5,280,388 A | 1/1994 | Okayama |
| 5,299,275 A | 3/1994 | Jackson et al. |
| 5,301,241 A | 4/1994 | Kirk |
| 5,307,175 A | 4/1994 | Seachman |
| 5,317,394 A | 5/1994 | Hale et al. |
| 5,337,181 A | 8/1994 | Kelly |
| 5,426,521 A | 6/1995 | Chen et al. |
| 5,438,366 A | 8/1995 | Jackson et al. |
| 5,442,394 A | 8/1995 | Lee |
| 5,444,574 A | 8/1995 | Ono et al. |
| 5,465,147 A | 11/1995 | Swanson |
| 5,473,473 A | 12/1995 | Estelle et al. |
| 5,476,515 A | 12/1995 | Kelman et al. |
| 5,521,695 A | 5/1996 | Cathey, Jr. et al. |
| 5,532,742 A | 7/1996 | Kusaka et al. |
| 5,555,129 A | 9/1996 | Konno et al. |
| 5,565,668 A | 10/1996 | Reddersen et al. |
| 5,568,197 A | 10/1996 | Hamano |
| 5,572,359 A | 11/1996 | Otaki et al. |
| 5,610,684 A | 3/1997 | Shiraishi |
| 5,640,206 A | 6/1997 | Kinoshita et al. |
| 5,706,139 A | 1/1998 | Kelly |
| 5,751,475 A | 5/1998 | Ishiwata et al. |
| 5,756,981 A | 5/1998 | Roustaei et al. |
| 5,969,853 A | 10/1999 | Takaoka |
| 5,969,855 A | 10/1999 | Ishiwata et al. |
| 6,021,005 A | 2/2000 | Cathey, Jr. et al. |
| 6,025,873 A | 2/2000 | Nishioka et al. |
| 6,034,814 A | 3/2000 | Otaki |
| 6,037,579 A | 3/2000 | Chan et al. |
| 6,069,738 A | 5/2000 | Cathey, Jr. et al. |
| 6,091,548 A | 7/2000 | Chen |
| 6,097,856 A | 8/2000 | Hammond, Jr. |
| 6,121,603 A | 9/2000 | Hang et al. |
| 6,128,127 A | 10/2000 | Kusaka |
| 6,133,986 A | 10/2000 | Johnson |
| 6,144,493 A | 11/2000 | Okuyama et al. |
| 6,172,723 B1 | 1/2001 | Inoue et al. |
| 6,172,799 B1 | 1/2001 | Raj |
| 6,208,451 B1 | 3/2001 | Itoh |
| 6,218,679 B1 | 4/2001 | Takahara et al. |
| 6,219,113 B1 | 4/2001 | Takahara |
| 6,248,988 B1 | 6/2001 | Krantz |
| 6,285,345 B1 | 9/2001 | Crossland et al. |
| 6,288,382 B1 | 9/2001 | Ishihara |
| 6,337,472 B1 | 1/2002 | Garner et al. |

FOREIGN PATENT DOCUMENTS

| | | |
|---|---|---|
| EP | 0618473 A2 | 10/1994 |
| EP | 0742466 A | 11/1996 |
| EP | 0759573 A2 | 2/1997 |
| EP | 0791846 A2 | 8/1997 |
| EP | 0981245 A2 | 2/2000 |
| GB | 2278750 A | 12/1994 |
| JP | 2000-98301 A | 4/2000 |
| WO | WO 99/57599 | 11/1999 |
| WO | WO-00/52513 A | 9/2000 |

OTHER PUBLICATIONS

J. Ojeda–Castaneda, L. R. Berriel–Valdos, and E. Montes, "Spatial filter for increasing the depth of focus", Optics Letters, vol. 10, No. 11, p520–522, Nov., 1985.

J. Ojeda–Castaneda, and A. Diaz, "High focal depth by quasibifocus", vol. 27, No., 20, p4163–4165, Oct. 15, 1988.

W. Chi and N. George, "Electronic imaging using a logarithmic asphere", Optics Letters, vol. 26, No., 12, p875–877, Jun. 15, 2001.

J. Ojeda–Castaneda, E. Tepichin, and A. Pons, "Apodization of annular apertures: Strehl ratio", Applied Optics, vol. 27, No. 24, p 5140–5145, Dec. 15, 1988.

D. L. Marks, R. A. Stack, D. J. Brady, and J. Van Der Gracht, "Three–dimensional tomography using a cubic–phase plate extended depth–of–field system", Optics Letters, vol. 24, No. 4, p 253–255, Feb. 15, 1999.

S. C. Tucker, W. T. Cathey, and E. R. Dowski, Jr, "Extended depth of field and aberration control for inexpensive digital microscope systems", Optics Express, vol. 4, No. 11, p467–474, May 24, 1999.

H. Bartelt, J. Ojeda–Castaneda, and E. E. Sicre, "Misfocus tolerance seen by simple inspection of the ambiguity function", Applied Optics, vol. 23, No. 16, p 2693–2696, Aug. 15, 1984.

J. Ojeda–Castaneda, L. R. Berriel–Valdos, and E. Montes, "Ambiguity function as a design tool for high focal depth", Applied Optics, vol. 27, No. 4, p 790–795, Feb. 15, 1988.

J. Ojeda–Castaneda, P. Andres, and A. Diaz, "Annular apodizers for low sensitivity to defocus and to spherical aberration", Optics Letters, vol. 11, No. 8, p 487–489, Aug., 1986.

J. Ojeda–Castaneda, E. Tepichin, and A. Diaz, "Arbitrarily high focal depth with a quasioptimum real and positive transmittance apodizer", Applied Optics, vol. 28, No. 13, p 2666–2670, Jul. 1, 1989.

J. Ojeda–Castaneda, and L. R. Berriel–Valdos, "Arbitrarily high focal depth with finite apertures", Optics Letters, vol. 13, No. 3, p 183–185, Mar., 1986.

G. Indebetouw, and H. Bai, "Imaging with Fresnel zone pupil masks: extended depth of field", Applied Optics, vol. 23, No. 23, p 4299–4302, Dec. 1, 1984.

W. T. Welford, "Use of annular apertures to increase focal depth", Journal of the Optical Society of America, vol. 50, No. 8, p 749–753, Aug., 1960.

C. Varamit, and G. Indebetouw, "Imaging properties of defocused partitioned pupils", J. Opt. Soc. Am. A, vol. 2, No. 6, p 799–802, Jun. 1985.

E. R. Dowski Jr., and W. T. Cathey, "Single lens single–image incoherent passive–ranging systems", Applied Optics, vol. 33, No. 29, p 6762–6773, Oct. 10, 1994.

W. T. Cathey, B. R. Frieden, W. T. Rhodes, and C. K. Rushforth, "Image gathering and processing for enhanced resolution", J. Opt. Soc. Am. A, vol. 1, No. 3, p 241–250, Mar. 1984.

J. Van Der Gracht, E. R. Dowski Jr., M. G. Taylor, and D. M. Deaver, "Broadband behavior of an optical–digital focus–invariant system", Optics Letters, vol. 21, No. 13, p 919–921, Jul. 1, 1996.

G. Hausler, "A method to increase the depth of focus by two step image processing", Optical Communications, vol. 6, No. 1, p 38–42, Sep., 1972.

C. J. Cogswell, N. I. Smith, K. G. Larkin, and P. Hariharan, "Quantitative DIC microscopy using a geometric phase shifter", SPIE, vol. 2984, p72–81, 1997.

H. Wang, and F. Gan, "High focal depth with a pure–phase apodizer", Applied Optics, vol. 40, No. 31, p 5658–5662, Nov. 1, 2001.

H. Wang, and F. Gan, "Phase–shifting apodizers for increasing focal depth", Applied Optics, vol. 41, No. 25, p5263–5266, Sep. 1, 2002.

S. S. Sherif, E. R. Dowski, Jr and W. T. Cathey, "A logarithmic phase filter to extend the depth of field of incoerent hybrid imaging systems", Applied Optics, in press.

D. Kermisch, "Partially coherent image processing by laser scanning", Journal of the Optical Society of America, vol. 65, No. 8, p 887–891, Aug., 1975.

R. J. Pieper and A. Korpel, "Image processing for extended depth of field", Applied Optics, vol. 22, No. 10, p 1449–1453, May 15, 1983.

G. E. Johnson, E. R. Dowski, Jr, and W. T. Cathey, "Passive ranging through wave–front coding: information and application", Applied Optics, vol. 39, No. 11, p 1700–1710, Apr. 10, 2000.

G. Y. Sirat, "Conoscopic holography, I. Basic principles and physical basis", J. Opt. Soc. Am. A, vol. 9, No. 1, p 70–90, Jan. 1992.

E. R. Dowski, Jr, and W. T. Cathey, "Extended depth of field through wave–front coding", Applied Optics, vol. 34, No. 11, p 1859–1866, Apr. 10, 1995.

H. B. Wach, E. R. Dowski,Jr., and W. T. Cathey, "Control of chromatic focal shift through wave–front coding", Applied Optics, vol. 37, No. 23, p 5359–5367, Aug. 10, 1998.

D. Kermisch, "Principle of equivalence between scanning and conventional optical imaging systems", J. Opt. Soc. Am, vol. 67, No. 10, p 1357–1360, Oct., 1977.

J. Ojeda–Castaneda, R. Ramos and A. Noyola–Isgleas, "High focal depth by apodization and digital restoration", Applied Optics, vol. 27, No. 12, p 2583–2586, Jun. 15, 1988.

J. Ojeda–Castaneda., and L. R. Berriel–Valdos, "Zone plate for arbitrarily high focal depth", Applied Optics, vol. 29, No. 7, p 994–997, Mar. 1, 1990.

J.T. McCrickerd, "Coherent processing and depth of focus of annular aperture imagery", Applied Optics, vol. 10, No. 10, p2226–2230, Oct., 1971.

M.Mino and Y. Okano, "Improvement in the OTF of a defocused optical system through the use of shade apertures", Applied Optics, vol. 10, No. 10, p2219–2225, Oct., 1971.

S. Kubo, M. Inui, and Y. Miyake, "Preferred sharpness of photographic color images", Journal of Imaging Science, vol. 29, No. 6, p213–215, Nov./Dec. 1985.

C. J. Cogswell and C. J. R. Sheppard, "Confocal differential interference contrast (DIC) microscopy: including a theoretical analysis of conventional and confocal DIC imaging", Journal of Microscopy, vol. 165, part 1, p 81–101, Jan., 1992.

J. M. Schmitt, S. L. Lee and K. M. Yung, "An optical coherence microscope with enhanced resolving power in thick tissue", Optics Communications, vol. 142, p 203–207, Oct. 15, 1997.

K. J. Barnard, E. A. Watson and P. F. McManamon, "Nonmechanical microscanning using optical space–fed phased arrays", Optical Engineering, vol. 33, No. 9, p 3063–3071, Sep., 1994.

W. T. Cathey and W. C. Davis, "Imaging system with range to each pixel", J Opt. Soc. Am A, vol. 3, No. 9, p1537–1542, Sep., 1986.

J. E. Greivenkamp, "Color dependent optical prefilter for the suppression of aliasing artifacts", Applied Optics, vol. 29, No. 5, p 676–684, Feb. 10, 1990.

J. T. McCrickerd, "Coherent processing and depth of focus of annular aperture imagery", Applied Optics, vol. 10, No. 10, p 2226–2230, Oct., 1971.

M. Kawakita, K. Iizuka, T. Aida, H. Kikuchi, H. Fujikake, J. Yonai and K. Takizawa, "Axi–version camera: a three–dimension camera", In Three–dimensional Image Capture and Applications III, Brian D. Comer, Joseph H. Nurre, Editors, Proceedings of SPIE, vol. 3958, p 61–70, 2000.

C. Wust and D. W. Capson, "Surface profile measurement using color fringe projection", Machine Vision and Applications, vol. 4, p 193–203, 1991.

S. V. Shatalin, J. B. Tan, R. Juskaitis and T. Wilson, "Polarization contrast imaging of thin films in scanning microscopy", Optics Communications, vol. 116, p 291–299, May 1, 1995.

T. Fukano, "Geometrical cross–sectional imaging by a heterodyne wavelength–scanning interference confocal microscope", Optics Letters, vol. 25, No. 8, p 548–550, Apr. 15, 2000.

Q–S. Chen and M. S. Weinhous, "Sub–pixel shift with fourier transformation to achieve efficient and high quality image interpolation", SPIE, vol. 2, No. 3661, p 728–736, Feb. 1999.

H. Wei, and T. D. Binnie, "High–resolution image reconstruction for multiple low–resolution images", 7th International Conference on Image Processing and Its Applications, Pub. # 465, vol. 2 p596–600 (1999).

G. Hausler, and E. Korner, "Imaging with expanded depth of focus", Zeiss Inform, Oberkochen, 29, No. 98E, p 9–13 (1986/1987).

Hecht, Eugene, *Optics*, Second Edition, 1987, pp. 177–181.

Veldkamp, Wilfrid B., and McHugh, Thomas J., "Binary Optics", Scientific American, May 1, 1992, vol. 266, No. 5, pp. 50–55.

O'Shea, Donald C. and Harrigan, Michael E., "Chapter 33, Aberration Curves in Lens Design", Handbook of Optics, vol. 1, 1995, pp. 33.1–33.5, McGraw–Hill, New York.

Abstract of JP 60247611 A, published Jul. 12, 1985 (Toshiba KK), Patent Abstract of Japan, May 6, 1986, vol. 010, No. 119 (p–435), 1 page.

Poon, Ting–Chung and Motamedi, Masoud, "Optical/digital incoherent image processing for extended depth of field", Applied Optics, vol. 26, No. 21, Nov. 1, 1987, pp. 4612–4615.

Bradburn, Sarah, Cathey, Wade Thomas and Dowski, Edward R., Jr., "Realization of focus invariance in optical–digital systems with wave–front coding", Applied Optics vol. 36, No. 35, Dec. 10, 1997, pp. 9157–9166.

Van Der Gracht, Joseph, Dowski, Edward R., Jr., Cathey, W. Thomas and Bowen, John P., "Aspheric optical elements for extended depth of field imaging", SPIE vol. 2537, pp. 279–288.

WAVEFRONT CODED IMAGING SYSTEMS

CROSS-REFERENCE TO RELATED APPLICATIONS

This patent application is a continuation of commonly-owned and U.S. patent application Ser. No. 09/747,788, now abandoned, filed Dec. 22, 2000 and incorporated herein by reference. This patent application is also a continuation-in-part of commonly-owned and U.S. patent application Ser. No. 09/070,969, filed May 1, 1998 now abandoned and incorporated herein by reference. U.S. patent application Ser. No. 09/070,969 is a continuation-in-part of U.S. patent application Ser. No. 08/823,894, filed Mar. 17, 1997, now U.S. Pat. No. 5,748,371, issued May 5, 1998 and incorporated herein by reference. U.S. patent application Ser. No. 08/823,894 is a continuation of U.S. patent application Ser. No. 08/384,257, filed Feb. 3, 1995, now abandoned. U.S. application Ser. No. 09/875,435, filed Jun. 6, 2001, now U.S. Pat. No. 6,525,302, and pending U.S. application Ser. No. 09/875,766, filed Jun. 6, 2001, and U.S. application Ser. No. 09/766,325 filed Jan. 19, 2001 are each incorporated herein by reference.

BACKGROUND

Traditional optical design is based on the premise that the only major components of the imaging system are the optics and detector. The detector can be analog (e.g. film) or a digital detector (e.g., CCD, CMOS, etc.). Traditional image processing techniques performed on an image are performed after the image is formed. Examples of traditional image processing include edge sharpening and color filter array (CFA) color interpolation. Traditional optics are therefore designed to form images at the detector that are sharp and clear over a range of field angles, illumination wavelengths, temperatures, and focus positions. Consequently, a trade off is made between forming good images, which requires optical designs that are larger, heavier, and contain more optical elements than are desirable, and modifying the design in order to reduce size, weight, or the number of optical elements, which results in loss of image quality.

A need remains in the art for improved optical designs which produce good images with systems that are smaller, lighter, and contain fewer elements than those based on traditional optics.

SUMMARY

Optical design based on Wavefront Coding enables systems such that they can be smaller, lighter, and contain fewer optical elements than those based on traditional optics. Wavefront Coding systems share the task of image formation between optics and digital processing. Instead of the imaging system being primarily composed of optics and the detector, Wavefront Coding imaging systems are composed of optics, the detector, and processing of the detected image. The detector can in general be analog, such as film, or a digital detector. Since processing of the detected image is an integral part of the total system, the optics of Wavefront Coded imaging systems do not need to form sharp and clear images at the plane of the detector. It is only the images after processing that need to be sharp and clear.

Wavefront Coding, in general, corrects for known or unknown amounts of "misfocus-like" aberrations. These aberrations include misfocus, spherical aberration, petzval curvature, astigmatism, and chromatic aberration. System sensitivities to environmental parameters such as temperature and pressure induced aberrations, and mechanical focus related aberrations from fabrication error, assembly error, drift, wear, etc., are also reduced with Wavefront Coding. Optical designs based on Wavefront Coding can reduce the effects of these aberrations and result in simpler designs that produce good images.

Optical system designs according to the present invention are improved in that they have the characteristic that the transverse ray intercept curves are substantially straight lines. Unlike traditional optical designs, the transverse ray intercept curves for wavefront coded systems need not have a near zero slope; the slope, which indicates misfocus, may be substantial, because wavefront coding allows the effects due to misfocus to be removed. In actual systems, the transverse ray intercept curves should vary mainly in slope over wavelength, field angles, temperature, etc., but need not be exactly straight lines; some ripple is acceptable. With wavefront coding optical surfaces and post processing, good images can be produced.

BRIEF DESCRIPTION OF THE DRAWINGS

FIG. 15b shows MTFs for the system of FIG. 15a.

DETAILED DESCRIPTION OF THE DRAWINGS

Figure 1:
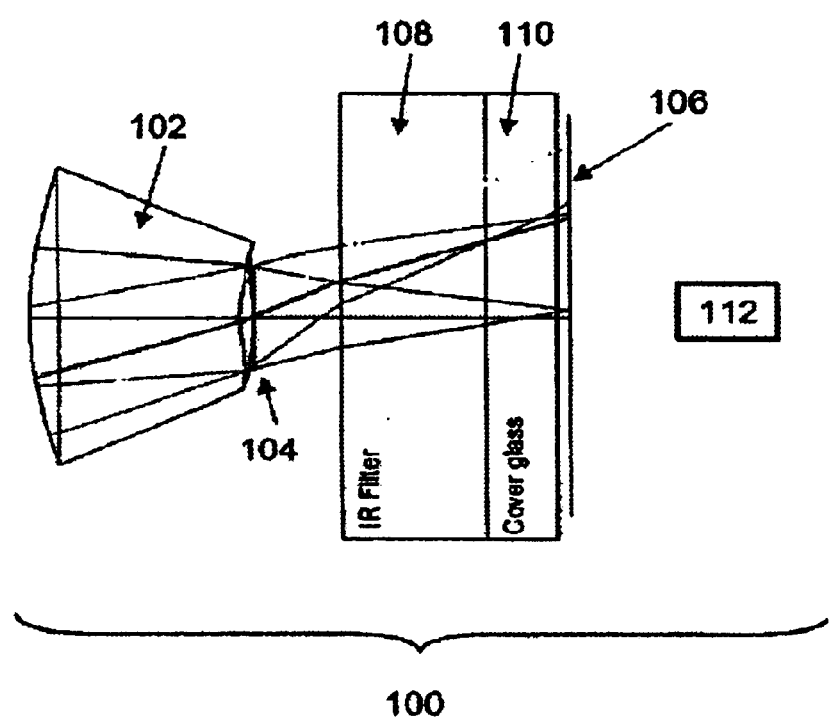
FIG. 1 shows a single-lens miniature imaging system according to the present invention.

FIG. 1 shows a single-lens miniature imaging system 100 according to the present invention. Lens 102 includes wavefront coding element 104 formed on its second surface. Detector 106 is preceded by an infrared (IR) filter 108 and cover glass 110. Post processing filter 112 performs processing on the images captured by detector 106.

The exemplary single-lens imaging system (singlet) 100 is designed to meet the following specifications:

f=2.5 mm

F/#=2.6

Length<4.5 mm

Material: Polymethylmethacrylate (PMMA)

FOV=50°

Focus: ∞–30 cm pixel size=6 µm

Bayer CFA/100% fill factor

MTF>40% at 40 lp/mm.

The exemplary singlet 100, without Wavefront Coding element 104, was designed so that the aberrations that are not corrected by the optical surfaces, namely petzval curvature and axial chromatic aberration, are a type of misfocus. Specifically, petzval curvature is a type of misfocus with field angle, and axial chromatic aberration is misfocus with illumination wavelength. The effect of these aberrations could hypothetically be corrected within small regions of the image plane by changing the focus position. By adding a Wavefront Coding surface, the resulting MTFs and PSFs will be insensitive to the focus-like aberrations. However, the MTFs and PSFs will not be the same as an ideal in-focus MTF or PSF from a traditional imaging system. Image processing is required to restore the spatial character of the image and produce a sharp and clear image.

The form of the Wavefront Coding surface used in this example is $$S(x, y) = \sum a_i \text{sign}(x) \left|\frac{x}{r_n}\right|^{b_i} + a_i \text{sign}(y) \left|\frac{y}{r_n}\right|^{b_i}, \text{ where} \quad \text{(Eq. 1)}$$

the sum is over the index i. Sign(x)=−1 for x<0, +1 for x≧0.

The parameter $r_n$ is a normalized radius value. This particular Wavefront Coding surface is rectangularly separable and allows for fast software processing. Other forms of Wavefront Coding surfaces are nonseparable and are the sum of rectangularly separable forms. One non-separable form is defined as:

$$S(r,\theta) = \Sigma a_i r^{a_i} \cos(b_i \theta + \phi_i), \quad \text{(Eq. 2)}$$

where the sum is again over the subscript i.

There are an infinite number of Wavefront Coding surface forms. The Wavefront Coding surface for singlet 100 in this example is placed at the stop surface (e.g., Wavefront Coding element 104) and has the parameterized equation:

$$S(x, y) = \sum a_i \text{sign}(x) \left|\frac{x}{r_n}\right|^{b_i} + a_i \text{sign}(y) \left|\frac{y}{r_n}\right|^{b_i} \quad \text{(Eq. 3)}$$

and the parameter values for i=1, 2, 3 are:

$a_1=17.4171, b_1=2.9911$ $a_2=10.8895, b_2=6$ $a_3=3.8845, b_3=20.1909$ $r_n=0.459$.

Figure 2:
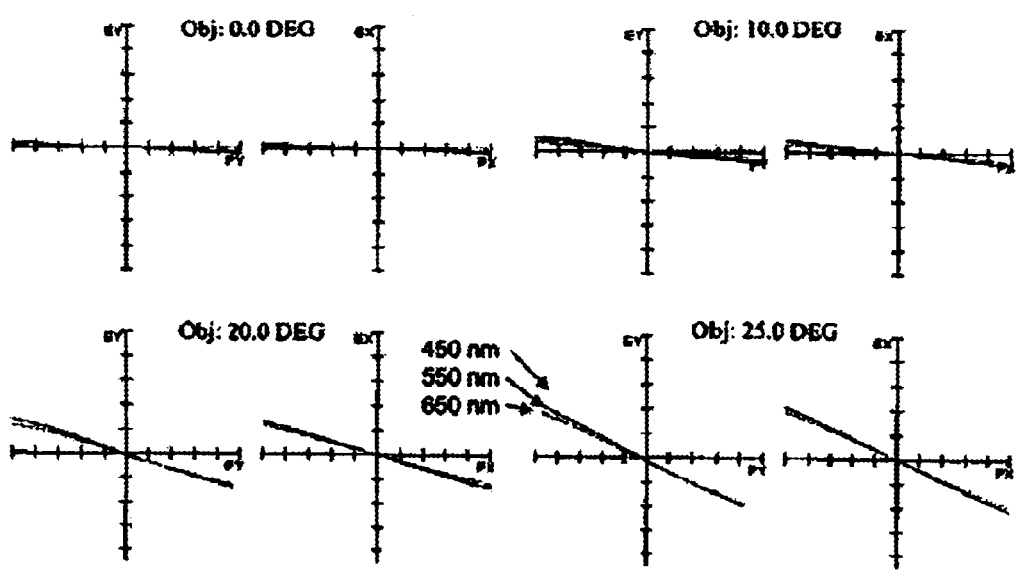
FIG. 2 illustrates a series of transverse ray intercept curves illustrating aberrations at various wavelengths for the system of FIG. 1 with wavefront coding removed.
Figure 3:
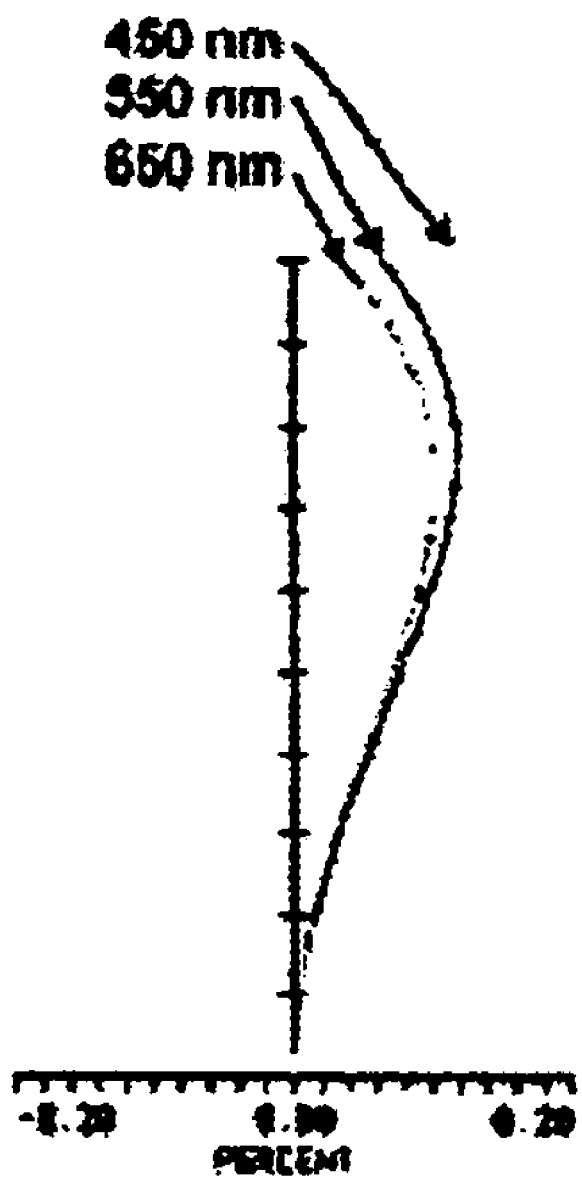
FIG. 3 illustrates distortion curves for the system of FIG. 1 with wavefront coding removed.
Figure 4:
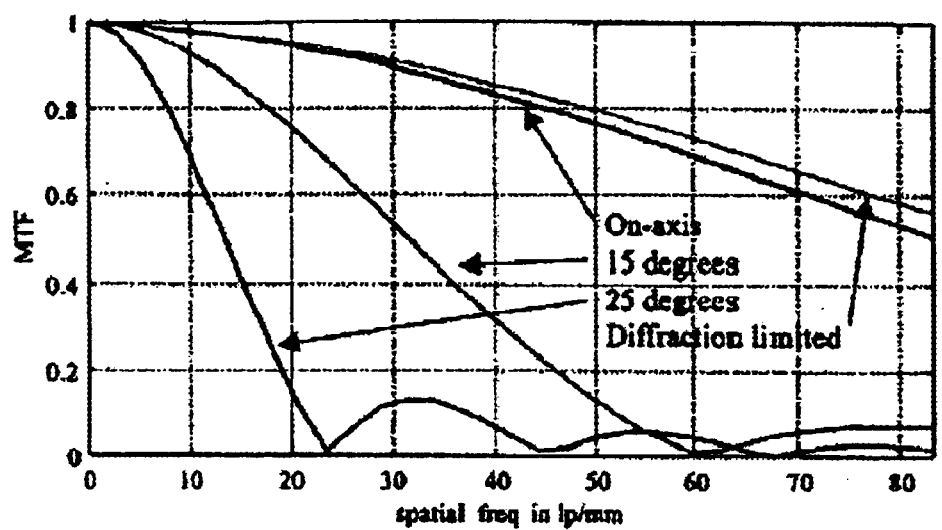
FIG. 4 illustrates modulation transfer functions (MTF) for the system of FIG. 1 with wavefront coding removed.
Figure 5:
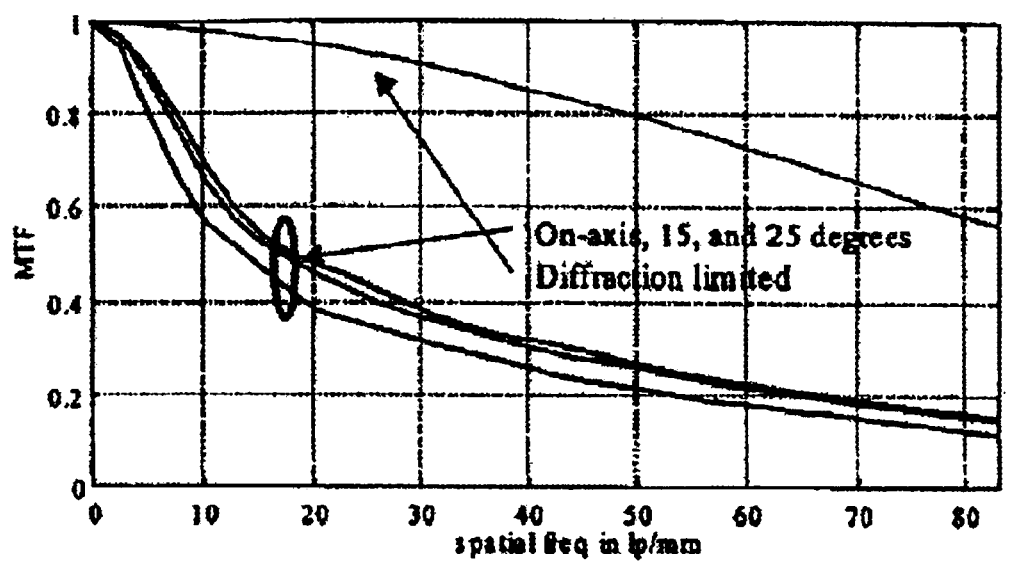
FIG. 5 illustrates MTFs for the system of FIG. 1 with wavefront coding, but without post processing.
Figure 6:
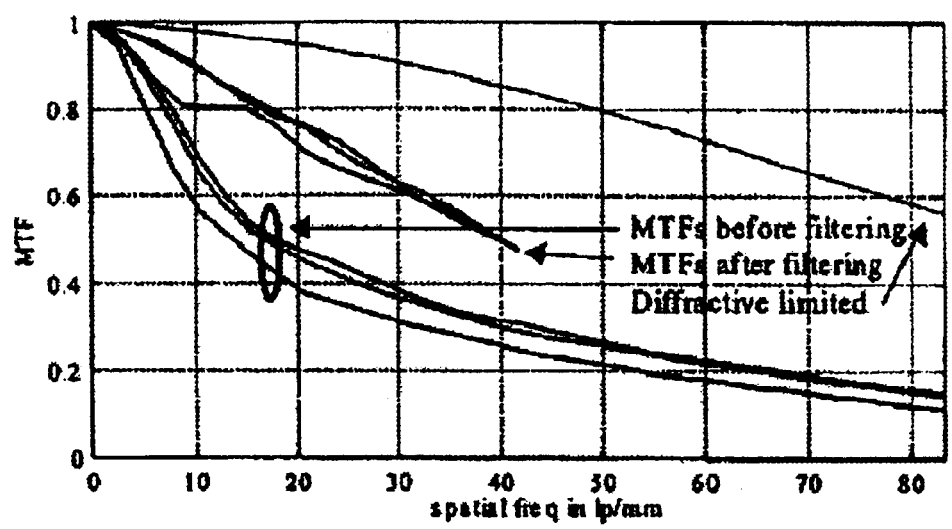
FIG. 6 illustrates MTFs for the system of FIG. 1 with wavefront coding, before and after filtering.
Figure 7:
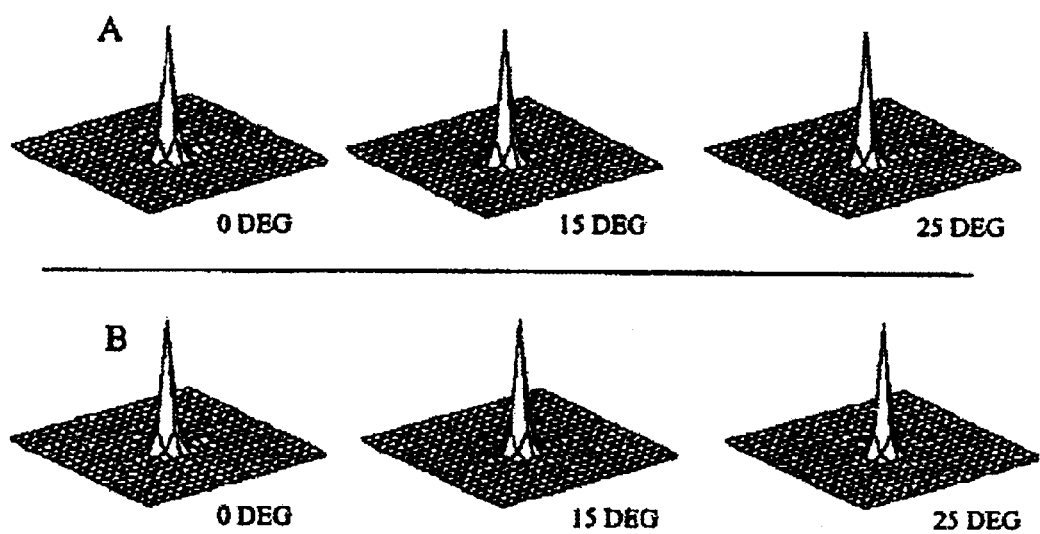
FIGS. 7a and 7b illustrate sampled point spread functions (PSF) for the system of FIG. 1 with wavefront coding and after filtering for two object distances.

FIGS. 2–4 illustrate the performance of system 100 with wavefront coding element 104 removed, in order to illustrate design requirements and performance. FIG. 5 illustrates the performance of system 100 with wavefront coding element 104 in place, but without post processing filter 112. FIG. 6 illustrates the performance improvement with post processing 112. FIGS. 7a and 7b show PSFs for system 100 with both wavefront coding and post processing.

FIG. 2 illustrates a series of transverse ray intercept curves illustrating aberrations at various wavelengths, for the system of FIG. 1 with wavefront coding element 104 removed for illustrative purposes. Curves are shown for system 100 at half field angles of 0°, 10°, 20° and 25° off axis, and for illumination wavelengths of 450 nm, 550 nm, and 650 nm. A slope of zero indicates an in-focus condition. Thus on-axis rays are nearly in focus. But, for off axis field angles, the slopes of the transverse ray intercept curves increase dramatically.

There are numerous traditional methods of designing lenses. Most methods try to balance aberrations in order to improve the off-axis imaging at the expense of on-axis imaging or system simplicity. Traditional design methodologies do not attempt to make the transverse ray intercept curves straight lines. Instead, the traditional goal is to try to minimize the distance of a substantial portion of the transverse ray intercept curves from the horizontal axis. In most traditional systems the ray intercept curves are very different from straight lines, but in general lie closer to the horizontal axis than the off-axis curves shown in FIG. 2. In other words, in traditional systems the variation from a straight horizontal line is mainly in the straightness of the line, rather than in its slope.

Figure 15A:
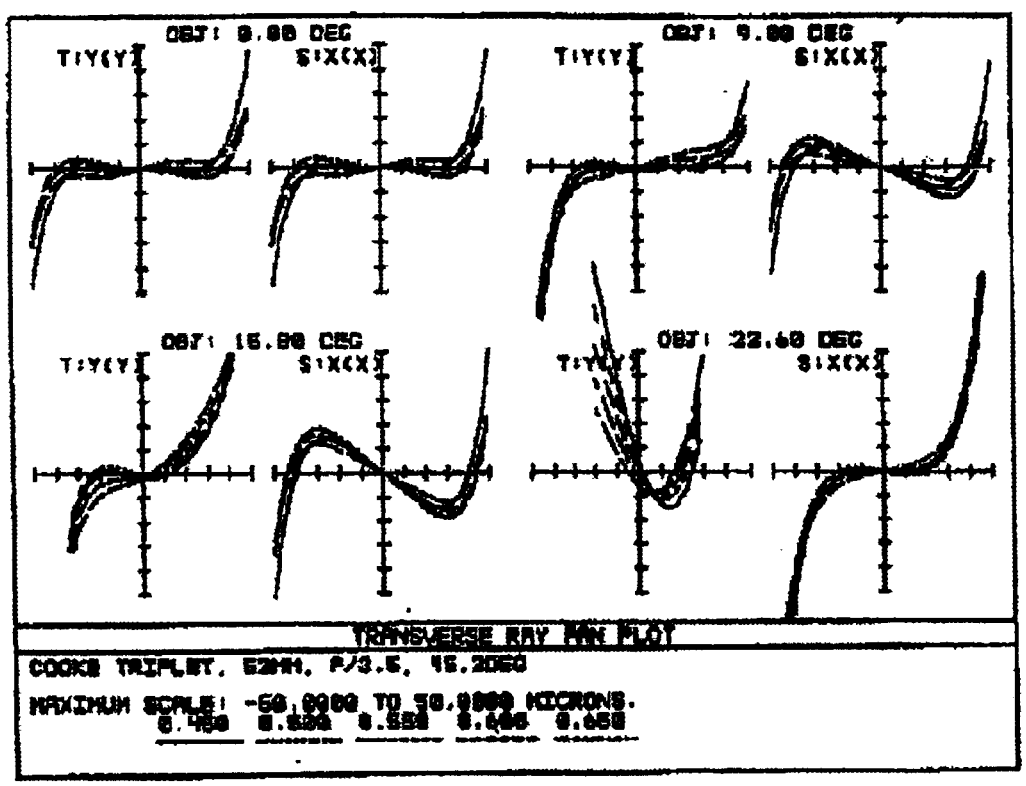
FIG. 15a illustrates transverse ray intercept curves as typically implemented in traditional imaging systems.
Figure 15B:
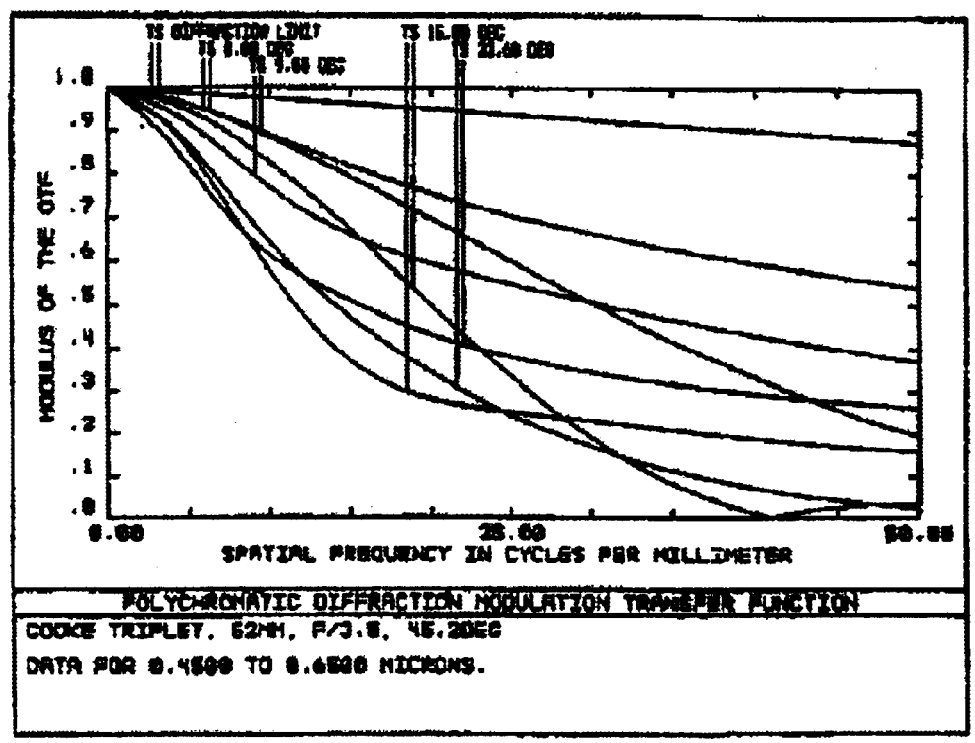

FIG. 15a (prior art) illustrates traditional transverse ray plots. These plots are taken from "Practical Computer Aided Lens Design", Gregory Hallick Smith, William Bell, Inc., Richmond 1998. Note that the plot for near on axis rays do look similar to straight horizontal lines, and thus produce an in focus image. Refer also to FIG. 15b which shows associated MTFs for this system. The MTFs for near on axis rays are good. But as the rays move further off axis, the plots in FIG. 15a quickly deviate from being straight lines. Their associated MTFs in 15b also quickly degrade.

The transverse ray intercept curves of FIG. 2 are essentially straight lines, both on and off axis. This is a deliberate design goal, because the use of wavefront coding element 104 and post processing filter 112 can bring the captured images into focus, so long as the curves without wavefront coding are essentially straight lines through the origin, even if the lines are significantly sloped. The effect of the slope is removed by adding wavefront coding and post processing.

The aberration petzval curvature gives rise to transverse ray intercept curves, with slopes that are a function of field angle. Axial chromatic aberration gives rise to ray intercept curves with slopes that are a function of illumination wavelength. From FIG. 2, both of these features are part of the transverse ray intercept curves in this exemplary design.

FIG. 3 illustrates distortion curves for system 100 of FIG. 1, with wavefront coding element 104 removed. The distortion is less than 0.2%. If distortion was large enough then additional digital processing might be required to reposition image points into a non-distorted image. Table 1 lists the optical prescription of this lens, again without the Wavefront Coding surface. Units are in mm, and the total length is 4.1 mm. Aspheric terms describe rotationally symmetric forms of $r^{order}$ with order equal to 4, 6, 8, etc.

TABLE 1

| Surface | Radius | Thickness | Material | Diameter |
|---|---|---|---|---|
| Obj | Inf | Inf | | 0 |
| 1 | 2.077 | 1.7133 | PMMA | 2 |
| Stop | −2.236 | 0.6498 | | 1.4 |
| 3 | Inf | 1.1 | BK7 | 3.4 |
| 4 | Inf | 0.55 | BK7 | 3.4 |
| Img | | 0.1 | | 3.4 |

| Surface | Conic | 4th Asph. | 6th Asph. | 8th Asph. |
|---|---|---|---|---|
| Obj | 0 | | | |
| 1 | −1.299 | −.000375 | −.010932 | −.00603 |
| Stop | −3.140 | −.01049 | | |
| 3 | 0 | | | |
| 4 | 0 | | | |
| Img | | | | |

FIG. 4 illustrates MTFs for system 100 of FIG. 1, without wavefront coding element 104. These MTFs correspond to the transverse ray aberration curves of FIG. 2. The MTFs are for half field angles 0, 15, and 25 degrees with wavelengths of 550 nm. The MTFs include the pixel MTF due to the Bayer color filter array detector with six micron pixels and 100% fill factor. The on-axis MTF is essentially diffraction limited. The large drop in MTF off-axis is due to the large amount of petzval curvature that is unavoidable in traditional single lens designs with a large field of view. This singlet without wavefront coding 104 does not meet the MTF specification of greater than 40% modulation at 40 lp/mm for all field angles. But, due to its design for Wavefront Coding, modifying the second surface with a Wavefront Coding surface on element 104 will lead to acceptable MTF modulation values when combined with digital processing. By changing the wavefront coding element 104 either more or less sensitivity to misfocus aberrations can be formed.

FIG. 5 illustrates MTFs for system 100 of FIG. 1 with wavefront coding element 104 in place but without post processing filter 112. The system is focused at infinity. The half field angles shown are 0, 15, and 25 degrees. The wavelength is 550 nm. These MTFs have very little variation with field angle due to the addition of the Wavefront Coding surface, as compared to FIG. 4. Pixel MTF due to the Bayer CFA has again been included. The Bayer CFA with 6 $\mu$m 100% fill factor pixels has a Nyquist spatial frequency of about 42 lp/mm. Note that there are purposely no zeros in the MTFs below the detector's Nyquist spatial frequency.

FIG. 6 illustrates MTFs for system 100 of FIG. 1, with wavefront coding element 104 and after processing filter 112. Applying a single digital filter in processing block 112 gives the optical/digital MTFs shown in FIG. 6. The MTFs before filtering are as shown in FIG. 5. The MTFs after processing filter 112 at the spatial frequency of 40 lp/mm are all above 40% as specified by the design specifications. The level of the MTFs after processing could further be increased beyond that of the traditional diffraction-limited case, but possibly at the expense of a lower signal to noise ratio of the final image.

FIGS. 7a and 7b illustrate sampled two-dimensional PSFs for system 100 of FIG. 1, with wavefront coding element 104 and after processing filter 112. FIG. 7a shows the processed PSFs when the object is at infinity. FIG. 7b shows the processed PSFs when the object is at 30 cm. These PSFs are for 550 nm wavelength and half field angles of 0, 15, and 25 degrees. After filtering, these PSFs have nearly ideal shapes. This singlet 100 when combined with wavefront coding and digital filtering thus easily meets the system specifications.

In one preferred embodiment, processing filter 112 is a rectangularly separable digital filter. Rectangularly separable filters are more computationally efficient (counting the number of multiplications and additions) than full 2D kernel filters. Separable filtering consists of filtering each row of the image with the 1D row filter and forming an intermediate image. The columns of the intermediate image are then filtered with the 1D column filter to provide the final in-focus image. The separable filter used for this exemplary singlet has the same filters for rows and columns.

Figure 16:
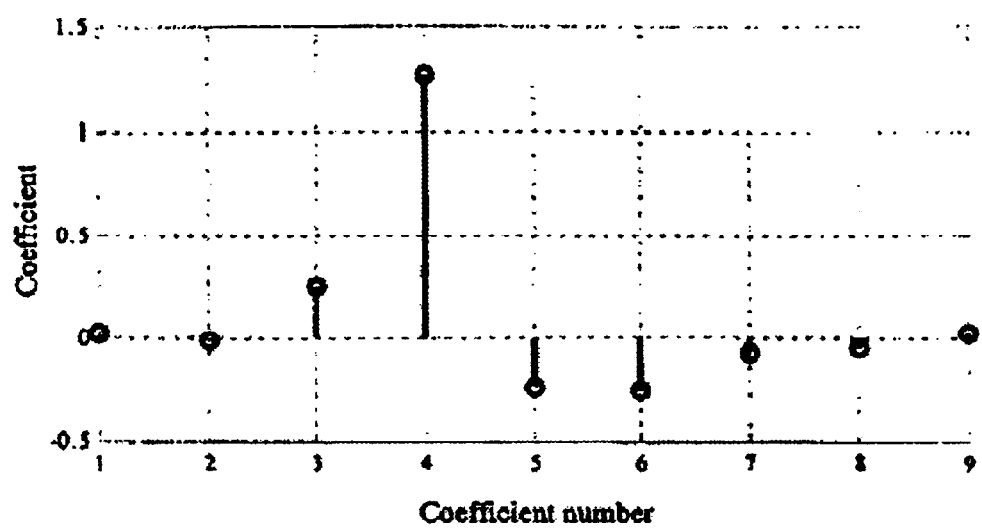
FIG. 16 illustrates an example of a one dimensional separable filter for use as a post processing element in the present invention.
Figure 17:
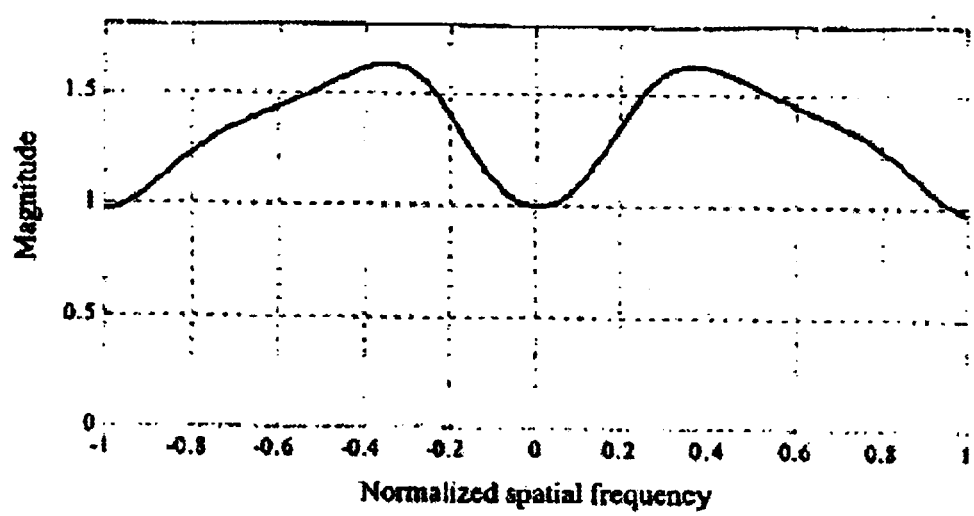
FIG. 17 illustrates the magnitude of the transfer function of the filter of FIG. 16.

FIG. 16 illustrates an example of a one dimensional separable filter as used as processing filter 112. Coefficients are represented as real values, but can be quantified into integer values for fixed point computations. The sum of the filter coefficients equals approximately 1. The coefficients were determined with a least squares algorithm by minimizing the squared difference between the filtered wavefront coded optical transfer functions (OTF) and a desired MTF with a value greater than 40% at 40 lp/mm. The width of the filtered PSFs of FIGS. 7a and 7b are also minimized with the least squares algorithm. Changes in the filtered PSFs are minimized in regions away from their central peaks. FIG. 17 illustrates the magnitude of the transfer function of the filter of FIG. 16. The zero spatial frequency value is 1.

Wavefront coding microscope objective 800 is designed to meet the following objectives:

magnification=10×

N.A.=0.15

Distortion<1%

7 micron square pixels with 100% fill factor

VGA grayscale detector

Optical material: PMMA.

The depth of field of traditional microscope objectives is described by the numerical aperture (NA) and the imaging wavelength. The wavefront coding objective can have a depth of field that is independent of the NA of the objective. The depth of field can be large enough to introduce prospective distortion to the final images. Regions of the object that are farther from the objective will appear smaller than regions of the object closer to the objective. Both near and far regions can image clearly with a large depth of field. Since the depth of field of traditional objectives is small, prospective distortion is not common with traditional objectives, especially with high NA. Prospective distortion can be reduced or eliminated by designing wavefront coding objectives that are telecentric. In telecentric imaging systems the magnification of the object is independent of the distance to the object.

Figure 8:
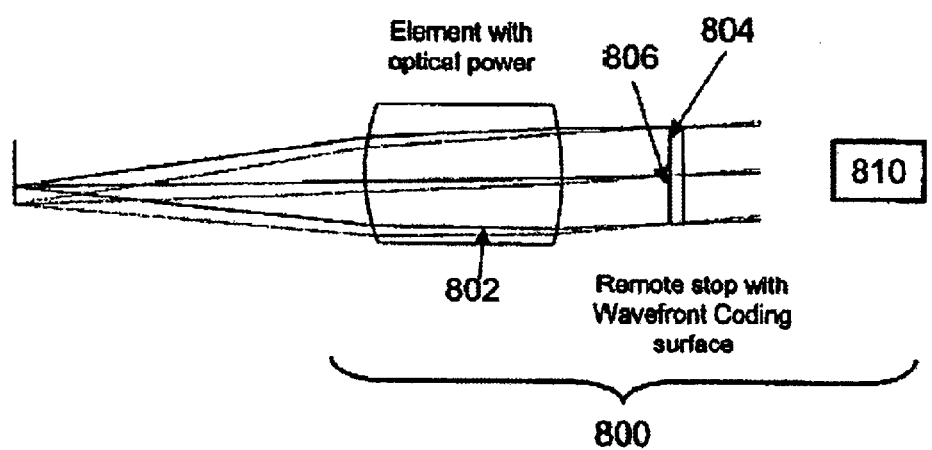
FIG. 8 shows a low cost microscope objective according to the present invention.
Figure 9:
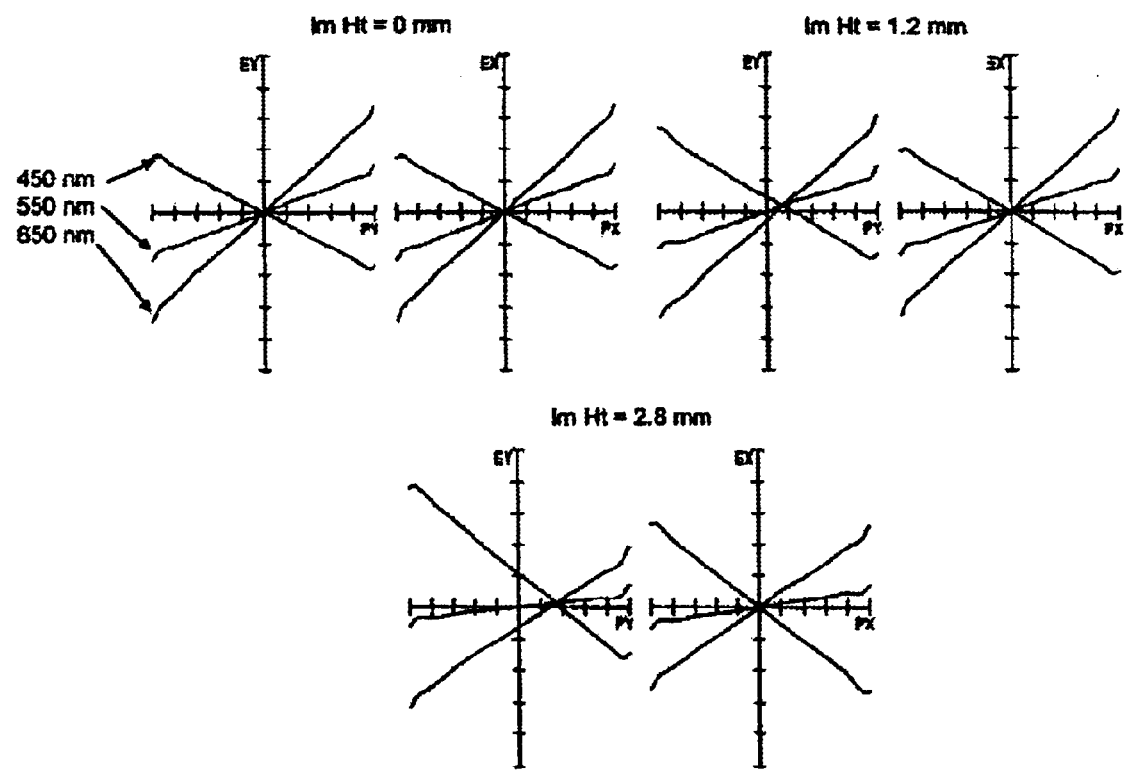
FIG. 9 illustrates a series of transverse ray intercept curves illustrating aberrations at various wavelengths for the system of FIG. 8 with wavefront coding removed.

FIG. 9 illustrates a series of transverse ray intercept curves illustrating aberrations at various wavelengths, for system 800 of FIG. 8, with wavefront coding element 806 removed. The ray intercept curves of FIG. 9 describe the performance of the system at wavelengths 450 nm, 550 nm and 650 nm for the image field heights of on-axis 0.0 mm, 1.2 mm and 2.8 mm. Full scale is +/−100 microns. Notice that each of these ray intercept curves vary mainly in slope, as required by the present invention (e.g., the shape of the curves are essentially the same when the slope components of the curves are not considered). While these plots are not quite as close to perfectly straight lines as those in FIG. 2, they can still be considered to be sloped substantially straight lines.

The major aberration apparent in this design is axial chromatic aberration, with a smaller amount of petzval curvature and lateral chromatic aberration. Without Wavefront Coding this lens would image poorly in white light, although it might produce a reasonable image in a single color. Tables 2 and 3 give the optical prescription for this system. Table 3 gives rotationally symmetric aspheric terms for the system.

TABLE 2

| Surface | Radius of curv | Thickness | Material | Diameter | Conic |
|---|---|---|---|---|---|
| Obj | Inf | 2.45906 | | 0.6357861 | 0 |
| 1 | 1.973107 | 1.415926 | Acrylic | 1.2 | −1.680295 |
| 2 | −2.882275 | 0.7648311 | Acrylic | 1.2 | −1.029351 |
| Stop | Inf | 0.1 | Acrylic | 0.841 | 0 |
| 4 | Inf | 25.83517 | | 0.841 | 0 |
| Img | | | | 6.173922 | |

TABLE 3

| Surface | 4th | 6th | 8th | 10th | 12th | 14th |
|---|---|---|---|---|---|---|
| 1 | 0.013191 | −0.22886 | 0.139609 | −0.250285 | −0.18807 | 0.193763 |
| 2 | −0.008797 | 0.017236 | 0.007808 | −0.223224 | 0.160689 | −0.274339 |
| Stop | −0.018549 | −0.010249 | −0.303999 | 1.369745 | 11.245778 | −59.7839958 |

Wavefront coding element 806 is placed at aperture stop 804, and is given by the rectangularly separable form of:

$$S(x, y) = \sum a_i \text{sign}(x)\left|\frac{x}{r_n}\right|^{b_i} + a_i \text{sign}(y)\left|\frac{y}{r_n}\right|^{b_i}, \quad \text{(Eq. 4)}$$

and the parameter values for i=1, 2 are:

$a_1 = 1.486852$, $b_1 = 3.0$ $a_2 = 3.221235$, $b_2 = 10.0$ $r_n = 0.419$.

Figure 10:
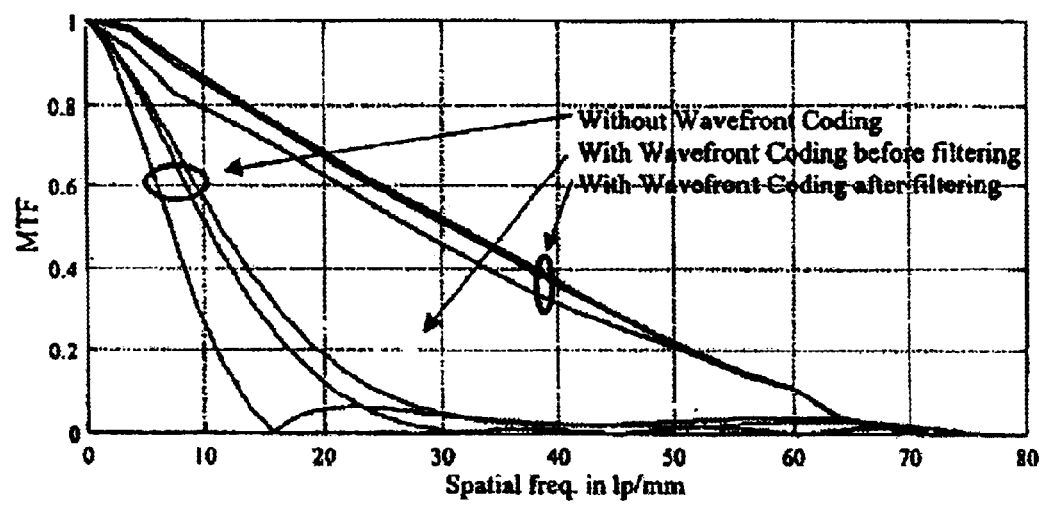
FIG. 10 illustrates MTFs for the system of FIG. 8 with wavefront coding, without wavefront coding, and with wavefront coding and filtering.

FIG. 10 illustrates MTFs for system 800 of FIG. 8 with wavefront coding, without wavefront coding, and with both wavefront coding and post processing filtering, for illumination at 450 nm. Image field heights are 0.0 mm, 1.2 mm and 2.8 mm.

Figure 11:
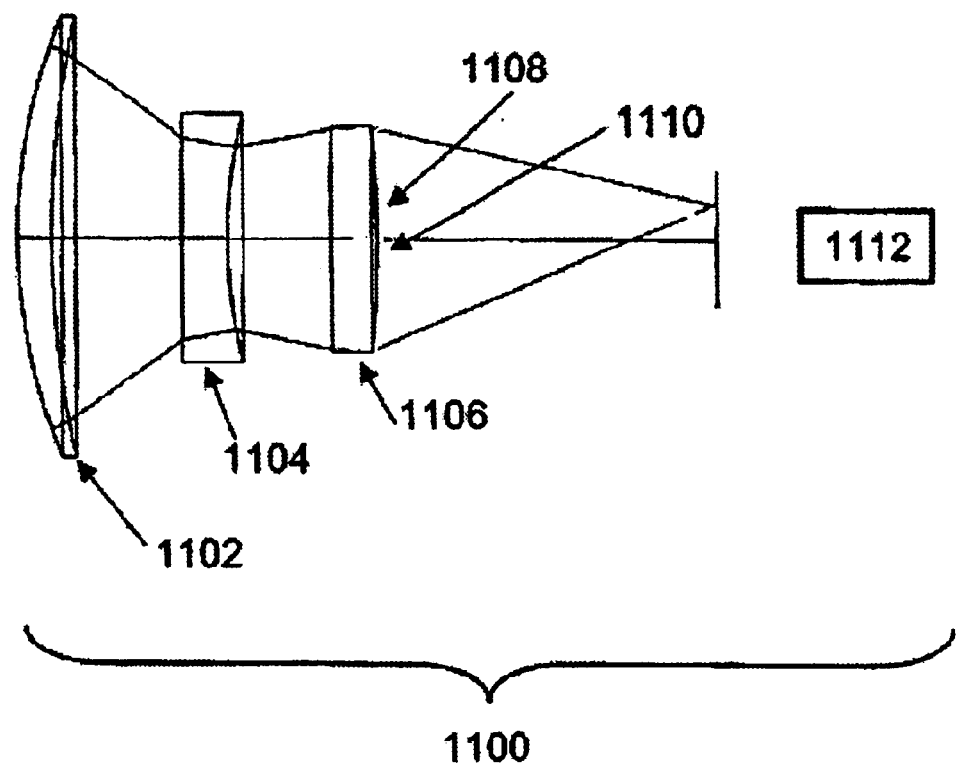
FIG. 11 shows a passive athermalized IR imaging system according to the present invention.

FIG. 11 shows a passive athermalized IR imaging system 1100 according to the present invention. Lens 1102 is composed of silicon. Lens 1104 is composed of germanium. Lens 1106 is composed of silicon. The aperture stop 1108 is at the back surface of lens 1106. Wavefront coding surface 1110 is on the back surface of lens 1106 (at aperture stop 1108). Processing block 1112 processes the image.

Design goals are as follows:

F/2 f=100 mm 3 deg half field of view

Illumination wavelength=10 microns 20 micron square pixels, 100% fill factor

Silicon & germanium optics

Aluminum mounts

Temperature range of −20° C. to +70° C.

Combined constraints of low F/#, inexpensive mounting material, and wide operating temperature make this design very difficult for traditional optics. Table 4 gives the optical prescription of system 1100.

TABLE 4

| Surface | Radius of curv | Thickness | Material | Diameter | Conic |
|---|---|---|---|---|---|
| Obj | Inf | Inf | | 0.6357861 | 0 |
| 1 | 58.6656 | 5.707297 | Silicon | 60 | 0 |
| 2 | 100.9934 | 22.39862 | | 57.6 | 0 |
| 3 | 447.046 | 8.000028 | Germanium | 32.4 | 0 |
| 4 | 50.88434 | 17.54754 | | 32.4 | 0 |
| 5 | 455.597 | 7.999977 | Silicon | 29.5 | 0 |
| Stop | −115.6064 | 57.9967 | | 29.5 | 0 |
| Img | | | | 6.173922 | |

The Wavefront Coding surface for IR system 100 of this example has the parameterized equation:

$$S(x, y) = \sum a_i \text{sign}(x)\left|\frac{x}{r_n}\right|^{b_i} + a_i \text{sign}(y)\left|\frac{y}{r_n}\right|^{b_i}, \quad \text{(Eq. 5)}$$

and the parameter values for i=1, 2 are:

$a_1 = 16.196742$, $b_1 = 3.172720$ $a_2 = -311.005659$, $b_2 = 20.033486$ $r_n = 18.314428$

Figure 12:
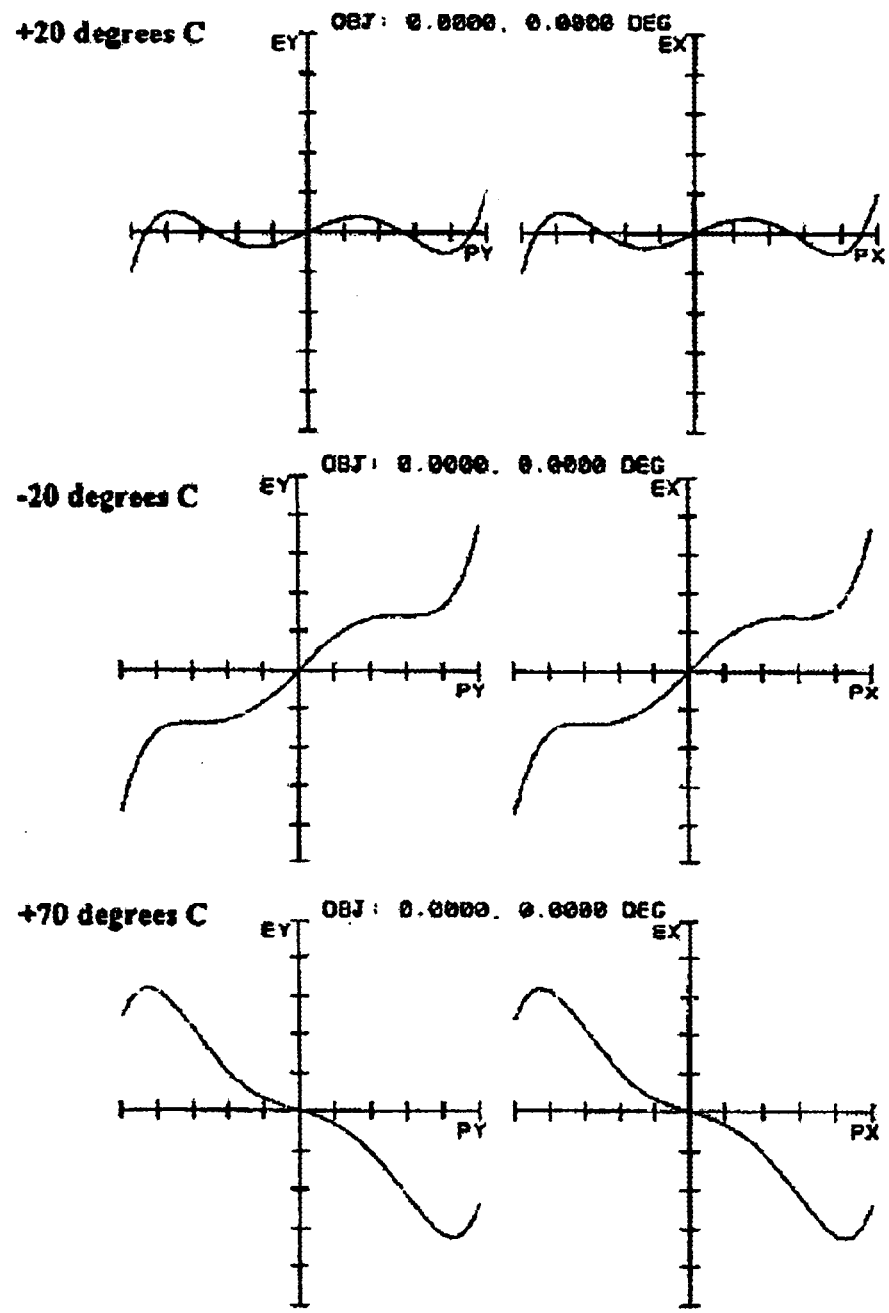
FIG. 12 illustrates a series of transverse ray intercept curves illustrating aberrations at various wavelengths for the system of FIG. 11 without wavefront coding.

FIG. 12 illustrates a series of transverse ray intercept curves illustrating aberrations at various wavelengths, for system 1100 of FIG. 11, with wavefront coding element 1110 removed. The ray intercept curves of FIG. 11 describe the performance of system 1100 at a wavelength of 10 microns, on axis field points for ambient temperatures of +20° C., −20° C., and +70° C. Full scale is +/−100 microns. Again these plots can be considered to be substantially straight lines. While they have more "wiggle" than the plots of FIGS. 2 and 9, in each case, if the plot were fitted to the closest straight line, the wiggles would not stray far from the line.

Figure 13:
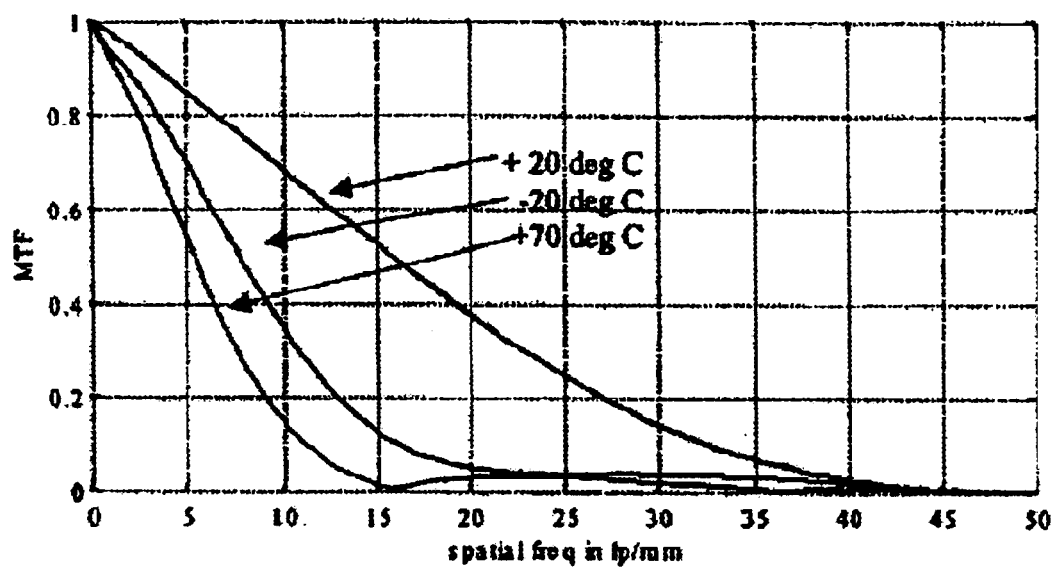
FIG. 13 illustrates MTFs for the system of FIG. 11 without wavefront coding.

FIG. 13 illustrates on-axis MTF curves for system 1100 without wavefront coding at three temperatures (+20°, −20° and +70°). Performance is nearly diffraction limited at +20°, but drops dramatically with changes in temperature.

Figure 14:
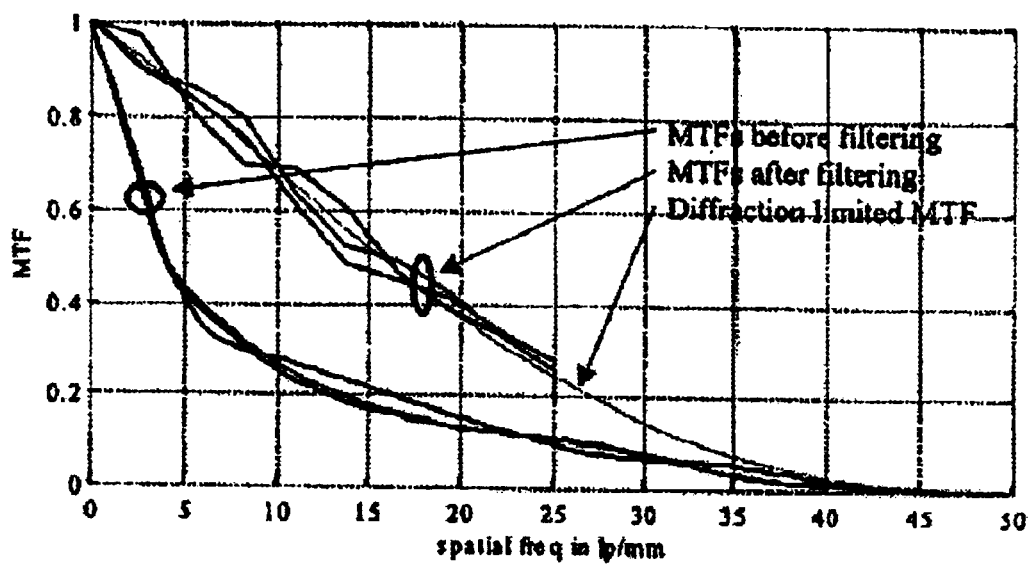
FIG. 14 illustrates MTFs for the system of FIG. 11 with wavefront coding, with and without filtering.

FIG. 14 illustrates MTFs for system 1100 of FIG. 11, with wavefront coding, both with and without filtering by processing block 1112. The illumination wavelength is 10 microns. The MTFs without filtering are significantly different from diffraction limited MTFs, but vary little with temperature. Thus, processing block 1112 is able to correct the images. The MTFs after filtering are near diffraction limited for all three temperatures (+20°, −20° and +70°). Filtered MTFs extend only to the Nyquist frequency of the 20 micron detector, or 25 lp/mm.

One preferred way to define what constitutes a transverse ray intercept curve that is a "substantially straight line" is to look at the MTFs over the entire useful range of the system with wavefront coding applied. These curves must be very close to each other, in order for the post processing to be able to move all MTFs to the desired performance level. Compare the MTFs of FIG. 4 (e.g., no wavefront coding) to those of FIG. 5 (e.g., wavefront coding). The FIG. 5 MTF curves are very close together. In FIG. 6, post processing has moved the MTFs to an acceptable level. More sophisticated post processing could improve the MTFs much further, to nearly diffraction limited performance, so long as the preprocessing curves are close enough together. Post processing could not accomplish this goal with the curves of FIG. 4, because they are not close together.

FIG. 10 also illustrates this concept. The MTF curves without wavefront coding do not track each other. The curves with wavefront coding are close together. Thus, the curves with wavefront coding after post processing are very good.

In FIGS. 13 and 14, the MTF curves without wavefront coding (e.g., FIG. 13) are far apart, but the MTF curves with wavefront coding (e.g., FIG. 14) are close enough together that the post processing curves are nearly diffraction limited.

In FIG. 13, it can be seen that the on-axis MTF (at +20° C., meaning essentially no temperature related misfocus) is essentially diffraction limited. This is the best case traditional MTF for this system. The MTFs at other temperatures, though, have greatly reduced performance due to temperature related effects.

Now consider the upper set of MTFs of FIG. 14, with wavefront coding and after processing. The MTFs are nearly identical. Thus the associated transverse ray intercept curves can be considered to be substantially straight lines, since they are close enough to straight to give essentially ideal MTFs.

For other systems, a lower level of performance may be acceptable, and consequently the deviation of the transverse ray intercept curves from a straight line may be larger. Such a situation would result if a fast lens (say F/2) is used with a digital detector, with, for example, 10 micron pixels. In 500 nm illumination, the diffraction limited MTF for the optical system would extend to 1000 lp/mm, but the highest spatial frequency that could be measured by the detector would be only 50 lp/mm. Thus, aberrations that alter the highest spatial frequencies of the optics are of no consequence, because they will not be measured by the detector. Note that while the transverse ray intercept curves may have noticeable deviations from a straight line (corresponding to the higher spatial frequencies), the transverse ray intercept curves are still "substantially straight lines" according to our definition, because the MTFs with wavefront coding are close together. The MTFs under consideration are those that correspond to the useful range of the particular system being considered.

Compare the MTFs of FIGS. 6, 10, and 14 with wavefront coding (e.g., useful range MTFs for embodiments of the present invention) with the MTFs resulting from traditional design of FIG. 15b. These traditional MTFs are quite far apart, so post processing could never give adequate performance. These curves are generally 50% or more apart, whereas the wavefront coding curves in FIGS. 6, 10, and 14, are within an average of 20% of each other over the useful range of the system, and, in the case of FIG. 10, are within an average of 10% of each other over the useful range of the system.

The major aberration apparent in the design of FIG. 11 is temperature related misfocus. Without Wavefront Coding, this lens would image poorly over a range of temperatures.

What is claimed is:

1. Imaging apparatus for imaging an object onto a detector, comprising:

a lens structure constructed and arranged between the object and the detector to produce transverse ray intercept curves which are sloped substantially straight lines;

a wavefront coding element constructed and arranged between the object and the detector to affect a phase of light transmitted by the wavefront coding element such that a modulation transfer function of the lens structure and wavefront coding element has reduced variation, over a range of spatial frequencies and caused by aberrations of the lens structure, as compared to a modulation transfer function of the lens structure without the wavefront coding element; and means for post-processing data from the detector to generate an image with an improved modulation transfer function, over the range of spatial frequencies, as compared to the modulation transfer function of the lens structure and the wavefront coding element.

2. The apparatus of claim 1 wherein the aberrations include one or more of the following:

spherical aberration;

petzval curvature;

astigmatism;

field curvature;

temperature induced misfocus aberration;

pressure induced misfocus aberration; and mechanical induced misfocus aberrations.

3. The apparatus of claim 2, the mechanical induced misfocus aberrations comprising one or more of a fabrication error, an assembly error, drift, and wear.

4. The apparatus of claim 1 wherein the wavefront coding element is formed substantially at an aperture stop of the imaging apparatus.

5. The apparatus of claim 1 wherein the lens structure comprises a single lens, a lens length from a front surface of the single lens to the detector being less than 10 mm.

6. The apparatus of claim 5 wherein the wavefront coding element is formed on the single lens.

7. The apparatus of claim 1 wherein the detector is an analog detector.

8. The apparatus of claim 1 wherein the detector is a digital detector.

9. Imaging apparatus for imaging an object onto a detector, comprising:

a lens structure constructed and arranged between the object and the detector, and at an aperture stop or conjugate of the aperture stop of the apparatus, to produce transverse ray intercept curves which are sloped substantially straight lines; and at least one surface of the lens structure forming a wavefront coding element to affect a phase of light transmitted by the wavefront coding element so as to alter an optical transfer function of the imaging apparatus such that the altered optical transfer function is substantially insensitive to focus-related aberrations over a greater range of aberrations than was provided by the unaltered optical transfer function.

10. The apparatus of claim 9 wherein the lens structure comprises a single lens, a lens length from a front surface of the single lens to the detector being less than 5 mm.

* * * * *